(12) United States Patent
Kwon

(10) Patent No.: US 7,427,642 B2
(45) Date of Patent: Sep. 23, 2008

(54) ARTIFICIAL MARBLE REUTILIZING WASTE MATERIALS AND PREPARATION THEREOF

(75) Inventor: Bong-Hyun Kwon, Cheongju-si (KR)

(73) Assignee: LG Chem. Ltd. (KR)

( * ) Notice: Subject to any disclaimer, the term of this patent is extended or adjusted under 35 U.S.C. 154(b) by 578 days.

(21) Appl. No.: 10/897,733

(22) Filed: Jul. 22, 2004

(65) Prior Publication Data

US 2005/0053730 A1    Mar. 10, 2005

(30) Foreign Application Priority Data

Jul. 29, 2003    (KR) .................. 10-2003-0052164

(51) Int. Cl.
  *C09D 5/29*    (2006.01)
  *C08K 3/18*    (2006.01)
  *C08L 33/08*   (2006.01)

(52) U.S. Cl. .................. 523/171; 428/15; 524/425; 524/437; 524/492; 524/560

(58) Field of Classification Search .................. 523/171
  See application file for complete search history.

(56) References Cited

U.S. PATENT DOCUMENTS

| | | | | |
|---|---|---|---|---|
| 4,183,991 A | * | 1/1980 | Smiley et al. .................. 524/35 |
| 4,643,921 A | * | 2/1987 | Terabe et al. .................. 428/15 |
| 6,384,101 B1 | | 5/2002 | Park et al. ..................... 522/71 |
| 6,440,538 B1 | | 8/2002 | Ungar ........................ 428/195 |
| 6,451,910 B1 | | 9/2002 | Koyanagi et al. ........... 524/854 |
| 6,475,631 B1 | | 11/2002 | Yamamoto et al. .......... 428/480 |
| 6,511,750 B1 | | 1/2003 | Yanagase et al. ............ 428/406 |
| 6,527,994 B1 | | 3/2003 | Hur et al. ..................... 264/73 |

FOREIGN PATENT DOCUMENTS

| | | |
|---|---|---|
| CN | 1060646 A | 4/1992 |
| CN | 1081950 A | 2/1994 |
| CN | 1227198 A | 9/1999 |
| JP | 10-217264 | 8/1998 |
| JP | 2000-317957 | 11/2000 |
| KR | 1981-000120 | 2/1981 |
| KR | 10-0270939 | 8/2000 |
| SU | 1728162 A1 * | 4/1992 |

OTHER PUBLICATIONS

Derwent Abstract 1993-115305 of Derwent Week 199314 for SU 1728162 A1, Apr. 23, 1992.*
Full English-language translation of SU 1728162 A1, Apr. 23, 1992.*

* cited by examiner

*Primary Examiner*—Vasu Jagannathan
*Assistant Examiner*—Vickey Ronesi
(74) *Attorney, Agent, or Firm*—Cantor Colburn LLP

(57) ABSTRACT

Provided is a process for preparing an artificial marble plate by reutilizing waste materials such as defective goods of conventional industrial highly light-transmissive polymethylmethacrylate based sheets, remnants produced during product-processing and the like, including polymethylmethacrylate based LCD light guide panels, having a refractive index of 1.47 to 1.53 and excellent optical characteristics wherein the polymer has an average molecular weight of 30,000 to 150,000.

5 Claims, 1 Drawing Sheet

ARTIFICIAL MARBLE REUTILIZING WASTE MATERIALS AND PREPARATION THEREOF

BACKGROUND OF THE INVENTION

1. Field of the Invention

The present invention relates to a process for preparing a plate-like artificial marble by reutilizing waste materials such as defective products of conventional industrial highly light-transmissive polymethylmethacrylate based sheets, remnants produced during product-processing and the like, including a polymethylmethacrylate based LCD (liquid crystal display) light guide panel, having a refractive index of 1.47 to 1.53 and excellent optical characteristics wherein a polymer has an average molecular weight of 30,000 to 150,000.

2. Description of the Related Art

Waste materials such as defective products, remnants produced during product-processing, and dusts produced during edge micro-processing and grinding, resulting from a preparation process of a polymethylmethacrylate based LCD light guide panel having excellent optical characteristics amount to 3,000 tons a year.

Conventionally, these materials have simply been disposed as industrial waste materials, or recovered, milled to a predetermined size and then subjected to extrusion or injection to reproduce industrial polymethylmethacrylate based sheet materials.

Further, a process for reproducing conventional industrial polymethylmethacrylate based sheet materials by recovering and washing waste materials of the conventional industrial highly light-transmissive polymethylmethacrylate based sheets and slabs, and milling them to a predetermined size, followed by extrusion or injection, was also known in the related art.

However, the above-mentioned process for reproducing sheet materials from waste materials of polymethylmethacrylate based products having excellent optical characteristics has no attractive advantage with respect to value added productivity and thus is not actively employed in the related industry.

Meanwhile, U.S. Pat. No. 6,384,101 discloses a surface treatment composition comprising an urethaneacrylate oligomer, an acrylate based monomer, a photoinitiator, a silicon additive, and silica matting agent in order to impart contamination, abrasion and scratch resistance as exhibited by marble. U.S. Pat. No. 6,440,538 discloses a laminate having a plurality of resin-impregnated layers to impart durability as exhibited by marble.

As prior arts relating to an artificial marble, U.S. Pat. No. 6,451,910 discloses an acrylic premix comprising an acrylic mono-functional monomer and a certain acrylic poly-functional monomer, which is useful for preparing an acrylic SMC (Sheet Molding Compound) having excellent high temperature-molding processability, thickening property and storage stability. U.S. Pat. No. 6,475,631 discloses an artificial marble comprising ZnO and the like, exhibiting antibacterial properties. U.S. Pat. No. 6,511,750 discloses an artificial marble comprising mica flakes, glass flakes, and the like, having an appearance remarkably resembling that of natural stone. U.S. Pat. No. 6,527,994 discloses an artificial marble having wave/wood patterns. However, the above-mentioned prior arts have focused on improvement of physical properties and appearance of the artificial marble.

In connection with the prior arts relating to a process for preparing an artificial marble using waste materials or waste resources as raw materials, Korean Patent No. 9,797 discloses a process for preparing a silicic acid-alumina-calcium oxide-alkali oxide based artificial dressed stone prepared by melting and crystallizing slag. Korean Patent No. 270,939 discloses an artificial marble and process for preparing the same, comprising the steps of finely milling waste woods such as wood flour, bamboo flour and waste substances, and waste materials such as carcasses of fish and shellfish and mixing them with a thermoplastic resin followed by molding. Additionally, Chinese Patent CN1060646, CN 1081950 and CN1227198 disclose a process for preparing an artificial marble using waste slag, waste marble and waste glass as a main raw material, respectively. However, the above-mentioned prior arts use waste materials having poor optical characteristics, and thus have a disadvantage of deteriorating physical properties and quality of the artificial marble products thus prepared.

SUMMARY OF THE INVENTION

Therefore, the present invention has been made in view of the above problems, and it was designed to develop a technique capable of obtaining products for other uses, thus further extending the range of reutilizing the above-mentioned waste materials and, therefore, it is an object of the present invention to provide an artificial marble and process for preparing the same using waste materials of polymethylmethacrylate based products having excellent optical characteristics as raw materials, thus realizing high value added products.

In accordance with the present invention, the above and other objects can be accomplished by the provision of an artificial marble prepared by using as raw materials, one or more of defective products of industrial acrylate based sheets having a refractive index of 1.47 to 1.53 and excellent optical characteristics wherein the polymer has an average molecular weight of 30,000 to 150,000, remnants produced during product-processing and dust of product-processing.

Specifically, the artificial marble in accordance with the present invention is prepared by mixing 100 to 250 parts by weight of an inorganic filler, 0.1 to 10 parts by weight of a cross-linkable additive, 0.1 to 5 parts by weight of a reaction initiator and 0 to 100 parts by weight of another additive with 100 parts by weight of a liquid syrup prepared by using one or more of defective products of industrial acrylate based sheets having a refractive index of 1.47 to 1.53 and excellent optical characteristics wherein a polymer has an average molecular weight of 30,000 to 150,000, remnants produced during product-processing and dust of product-processing, so as to form a plate-like marble having a thickness of, preferably, more than 1 mm. Amount of respective raw materials and additives used in the present invention is within the range of lower and upper limits necessary for preparing a conventional artificial marble.

The industrial acrylate based sheets having a refractive index of 1.47 to 1.53 and excellent optical characteristics wherein the polymer has an average molecular weight of 30,000 to 150,000, used in the present invention, are conventional industrial highly light-transmissive acrylate based sheets including LCD light guide panels.

Waste materials such as defective products, remnants produced during product-processing and dust of product-processing, which are derived from a process for preparing the conventional industrial highly light-transmissive acrylate based sheets including LCD light guide panels, typically have a refractive index and average molecular weight within the above-mentioned range. Considering the physical properties and quality of the resulting artificial marble, it is preferred to use waste resources of acrylate based sheets having a refractive index and average molecular weight within the above-mentioned range, as materials for preparing the artificial marble.

The liquid syrup, which is a base material for the artificial marble in accordance with the present invention, is prepared by mixing and dissolving 60 to 99 parts by weight of methylmethacrylate monomer and 1 to 40 parts by weight of one or a mixture of two or more of defective products of industrial acrylate based sheets having a refractive index of 1.47 to 1.53 and excellent optical characteristics wherein the polymer has an average molecular weight of 30,000 to 150,000, remnants produced during product-processing and dust of product-processing.

The inorganic filler used in the present invention may include at least one selected from aluminum hydroxide, magnesium hydroxide, calcium hydroxide, calcium carbonate and silica. The cross-linkable additive used in the present invention may be an acrylate based cross-linkable monomer having two or three functional groups. The reaction initiator used in the present invention may be at least one selected from peroxide and perester initiators. The other additive may include at least one selected from an antifoamer, a reaction modifier, a coupling agent, a UV absorber, a pigment, a color granule and a wetting agent.

As the acrylate based monomers having two or three functional groups, ethylene glycol dimethacrylic ester, diethylene glycol dimethacrylic ester, triethylene glycol dimethacrylic ester, tetraethylene glycol dimethacrylic ester, 1,6-hexanediol dimethacrylic ester, polybutylene glycol dimethacrylic ester, neopentyl glycol dimethacrylic ester, trimethylolpropane trimethacrylic ester, and the like may be used.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

A process for preparing the artificial marble according to the present invention will now be described in detail.

First, one or more of defective products of conventional industrial highly light-transmissive acrylate based sheets, including LCD light guide panels, having a refractive index of 1.47 to 1.53 and excellent optical characteristics wherein the polymer has an average molecular weight of 30,000 to 150,000, remnants produced during product-processing and dust of product-processing, including LCD light guide panels, were collected and milled in a mill into a maximum diameter of less than 10 mm, preferably 5 mm, more preferably 3.5 mm.

Next, 1 to 40 parts by weight of the milled materials and 60 to 99 parts by weight of methylmethacrylate monomer were mixed and dissolved at a temperature of 20 to 80° C. for 20 to 300 min to prepare a polymethylmethacrylate syrup, which is a base resin for the artificial marble.

The resulting polymethylmethacrylate syrup is a fluid having a constant viscosity and cohesive property. The viscosity thereof is between 100 cP, based on measurement with a Brookfield viscometer, 3 rotar, 30 rpm, 3 min, 23±2° C., and 10,000 cP, based on measurement with the same viscometer, 4 rotar, 30 rpm, 3 min, 23±2° C.

Next, 100 parts by weight of polymethylmethacrylate syrup, 100 to 250 parts by weight of an inorganic filler of one or more of aluminum hydroxide, calcium hydroxide, magnesium hydroxide, calcium carbonate and silica, having an average particle diameter of 8 to 100 µm, 0.1 to 10 parts by weight of an acrylate based monomer having two or three functional groups as a cross-linkable additive, 0.1 to 5 parts by weight of one or more peroxide and perester reaction initiators, 0.1 to 10 parts by weight of a silane coupling agent and 0 to 100 parts by weight of another additive, were mixed and deaerated under vacuum to prepare a mixture of raw materials having a viscosity of about 2,000 to 20,000 cP.

Figure 1:
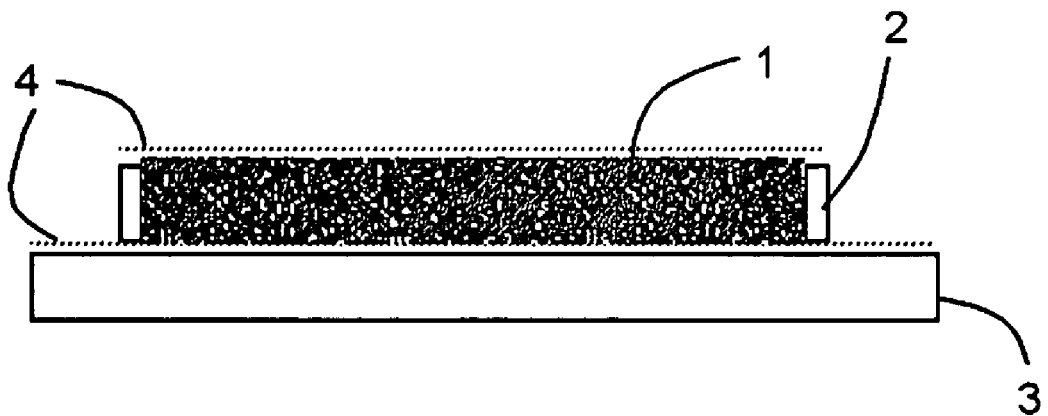
FIG. 1 is a cross-sectional view of a mold for preparing an artificial marble in accordance with the present invention.
Figure 2:
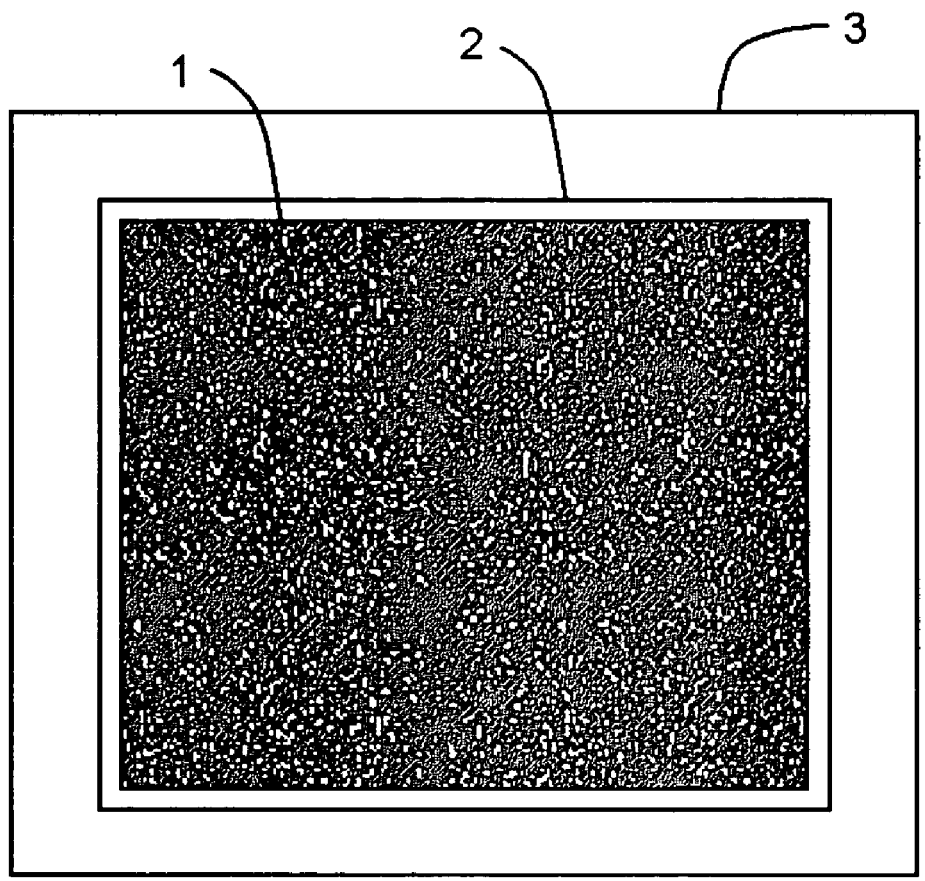
FIG. 2 is a plan view of a mold for preparing an artificial marble in accordance with the present invention.

Finally, the resulting mixture was placed in a mold as shown in FIGS. 1 and 2, using a continuous molding apparatus disclosed in Japanese Patent Application Laid-Open No. 10-217264 or No. 2000-317957, and reacted at a temperature of 30 to 100° C. for 10 to 100 min to continuously produce an artificial marble plate having a thickness of more than 1 mm, in the form of plate shape.

FIGS. 1 and 2 are, respectively, a cross-sectional view and plan view of the mold for preparing the artificial marble in accordance with the present invention. The mold is substantially composed of a gasket 2 disposed on a toughened glass plate 3. A raw material mixture 1 is charged to the inside of the gasket 2 in the form of the mold, and on the top and bottom surfaces thereof, a release film 4 is disposed for easily releasing the completed artificial marble product. The thickness and size of the products are determined depending on the specifications of the gasket 2.

In accordance with the present invention, there is provided a process for preparing a high quality artificial marble by utilizing as a raw material, waste materials such as defective products of an industrial highly light-transmissive polymethylmethacrylate sheets, and remnants produced during product-processing, including polymethylmethacrylate based LCD light guide panels, having excellent optical characteristics, and therefore a high value-added and remarkable invention is realized which reutilizes waste resources.

EXAMPLE

Comparative Example 1

A white acrylic artificial marble product primarily composed of a commercially available polymethylmethacrylate resin and aluminum hydroxide.

Comparative Example 2

5.5 kg of polymethylmethacrylate beads were dissolved in 14.5 kg of methylmethacrylate monomer to prepare a resin having a viscosity of about 700 to 800 cP.

Dissolution conditions are shown in Table 1.

TABLE 1

| Dissolution Temperature (° C.) | Dissolution Time (min) |
| --- | --- |
| 20~30 | More than 240 min |
| 30~40 | More than 150 min |
| 40~50 | More than 90 min |
| 50~60 | More than 70 min |
| 60~70 | More than 60 min |

100 parts by weight of the prepared resin, 180 parts by weight of aluminum hydroxide having an average particle diameter of about 25 μm as a filler, 3 parts by weight of ethylene glycol dimethacrylic ester (SR 206 from Sartomer Company, US) as a cross-linking agent, 1.8 parts by weight of a silane coupling agent (KBM 503 from Shin-Etsu Chemical Co., Ltd., Japan), 0.2 parts by weight of an antifoamer, and 1.0 part by weight of benzoylperoxide as a reaction initiator were mixed together and deaerated under vacuum to obtain a raw material mixture having a viscosity of about 6,000 cP.

The resulting mixture was poured into the mold as shown in FIGS. 1 and 2, and reacted in an oven at a temperature of about 80° C. for 60 min to prepare an artificial marble plate having dimensions of 350 mm wide×350 mm long×13 mm thick.

Example 1

Defective products of polymethylmethacrylate based LCD light guide panels having a refractive index of 1.48 to 1.51 and excellent optical characteristics wherein a polymer has an average molecular weight of 70,000 to 150,000, and remnants produced during product-processing were collected and milled into particles having a particle size of less than 3.5 mm. 5.5 kg of the milled particles was dissolved in 14.5 kg of methylmethacrylate monomer to prepare a resin having a viscosity of about 700 to 800 cP.

Dissolution conditions are shown in Table 2.

TABLE 2

| Dissolution Temperature (° C.) | Dissolution Time (min) |
| --- | --- |
| 20~30 | More than 300 min |
| 30~40 | More than 180 min |
| 40~50 | More than 120 min |
| 50~60 | More than 100 min |
| 60~70 | More than 80 min |

100 parts by weight of the prepared resin, 180 parts by weight of aluminum hydroxide having an average particle diameter of about 25 μm as a filler, 3 parts by weight of ethylene glycol dimethacrylic ester (SR 206 from Sartomer Company, US) as a cross-linking agent, 1.8 parts by weight of a silane coupling agent (KBM 503 from Shin-Etsu Chemical Co., Ltd., Japan), 0.2 parts by weight of an antifoamer, and 1.0 part by weight of benzoylperoxide as a reaction initiator were mixed together and deaerated under vacuum to obtain a raw material mixture having a viscosity of about 6,000 cP.

The resulting mixture was poured into the mold as shown in FIGS. 1 and 2, and reacted in an oven at a temperature of about 80° C. for 60 min to prepare an artificial marble plate having dimensions of 350 mm wide×350 mm long×13 mm thick.

Example 2

Defective products of an industrial polymethylmethacrylate based sheets having a refractive index of 1.48 to 1.51 and excellent light-transmissivity wherein a polymer has an average molecular weight of 30,000 to 120,000, and remnants produced during product-processing were collected and washed clean with water. They were then dried to a water content of less than 0.1% and milled into particles having a particle size of less than 3.5 mm. 5.5 kg of the milled particles was dissolved in 14.5 kg of methylmethacrylate monomer to prepare a resin having a viscosity of about 600 to 700 cP.

Dissolution conditions are shown in Table 3.

TABLE 3

| Dissolution Temperature (° C.) | Dissolution Time (min) |
| --- | --- |
| 20~30 | More than 300 min |
| 30~40 | More than 180 min |
| 40~50 | More than 120 min |
| 50~60 | More than 100 min |
| 60~70 | More than 80 min |

100 parts by weight of the prepared resin, 180 parts by weight of aluminum hydroxide having an average particle diameter of about 25 μm as a filler, 3 parts by weight of ethylene glycol dimethacrylic ester (SR 206 from Sartomer Company, US) as a cross-linking agent, 1.8 parts by weight of a silane coupling agent (KBM 503 from Shin-Etsu Chemical Co., Ltd., Japan), 0.2 parts by weight of an antifoamer, and 1.0 parts by weight of benzoylperoxide as a reaction initiator were mixed together and deaerated under vacuum to obtain a raw material mixture having a viscosity of about 6,000 cP.

The resulting mixture was poured into the mold as shown in FIGS. 1 and 2, and reacted in an oven at a temperature of about 80° C. for 60 min to prepare an artificial marble plate having dimensions of 350 mm wide×350 mm long×13 mm thick.

Physical properties were examined for the artificial marbles of the present invention prepared in Examples 1 and 2, and the artificial marbles of Comparative Examples 1 and 2. The results are shown in Table 4.

TABLE 4

| Items | Unit | Comp. Ex. 1 | Comp. Ex. 2 | Ex. 1 | Ex. 2 | Test Standard |
| --- | --- | --- | --- | --- | --- | --- |
| Specific Gravity | — | 1.745 | 1.752 | 1.750 | 1.751 | ASTM D-792 |
| Flexural Strength | kgf/mm$^2$ | 6.30 | 6.25 | 6.30 | 6.20 | ASTM D-790 |
| Tensile Strength | kgf/mm$^2$ | 2.70 | 2.70 | 2.70 | 2.70 | ASTM D-638 |
| Izod Impact Strength | kg.cm/cm | 1.45 | 1.45 | 1.50 | 1.45 | ASTM D-256 |
| Water Absorvity | % | 0.03 | 0.04 | 0.03 | 0.04 | ASTM D-570 |
| Heat Distortion Temperature (HDT) | ° C. | 102 | 110 | 111 | 109 | ASTM D-648 |
| Barcol Hardness | ° | 61 | 63 | 63 | 62 | ASTM D-785 |

As shown in Table 4, the artificial marble in accordance with the present invention exhibited high quality equal or superior to those of conventional artificial marbles. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A plate-like artificial marble having a thickness of more than 1 mm prepared by mixing 100 to 250 parts by weight of an inorganic filler, 0.1 to 10 parts by weight of a cross-linkable additive, 0.1 to 5 parts by weight of a reaction initiator and 0 to 100 parts by weight of an additive selected from an antifoamer, a reaction modifier, a coupling agent, a UV absorber, a pigment, a color granule and a wetting agent with 100 parts by weight of a liquid syrup made from defective products of industrial acrylate based sheets having a refractive index of 1.47 to 1.53 wherein the acrylate has an average molecular weight of 30,000 to 150,000, so as to form a marble plate; and wherein the liquid syrup is prepared by mixing and dissolving 60 to 99 parts by weight of methylmethacrylate monomer and 1 to 40 parts by weight of the defective products of industrial acrylate based sheets.

2. The artificial marble as set forth in claim 1, wherein the industrial acrylate based sheets are LCD light guide panels.

3. The artificial marble as set forth in claim 1, wherein the inorganic filler is at least one selected from aluminum hydroxide, magnesium hydroxide, calcium hydroxide, calcium carbonate and silica.

4. The artificial marble as set forth in claim 1, wherein the cross-linkable additive is an acrylate based cross-linkable monomer having two or three functional groups.

5. The artificial marble as set forth in claim 1, wherein the reaction initiator is peroxide or perester initiators.

* * * * *